United States Patent Office 3,642,859
Patented Feb. 15, 1972

3,642,859
PREPARATION OF MONO- AND DICHLORO-CYCLOBUTANECARBONITRILES BY CYCLO-ADDITION OF VINYL CHLORIDE AND AN ACRYLONITRILE
David M. Gale, Wilmington, Del., assignor to E. I. du Pont de Nemours and Company, Wilmington, Del.
No Drawing. Filed Feb. 11, 1969, Ser. No. 798,454
Int. Cl. C07c *121/46*
U.S. Cl. 260—464           6 Claims

ABSTRACT OF THE DISCLOSURE

A method for the preparation of chlorocyclobutane-carbonitriles by the cycloaddition of vinyl chloride and an acrylonitrile of the formula

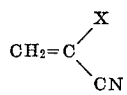

wherein X is H, Cl, Br or I. The compounds prepared by the method of this invention are dehydrohalogenated in strong base to form cyanocyclobutanes which can be employed in the preparation of useful polymeric and copolymeric films and fibers.

BACKGROUND OF THE INVENTION

(1) Field of the invention

This invention relates to the preparation of mono- and dichlorocyclobutanecarbonitriles by the cycloaddition of vinyl chloride and an acrylonitrile.

(2) Description of the prior art

So far as is known there are no references in the patent or general chemical literature dealing with the cycloaddition of vinyl chloride and acrylonitrile.

Both the cis- and trans-2-chlorocyclobutanecarbonitriles, the compounds prepared by the process of this invention, are known compositions of matter described by Nevill et al. in J. Orig. Chem., 27, 422 (1962). Coffman et al. have demonstrated cycloaddition of tetrafluoroethylene and a variety of olefinic compounds including vinyl chloride and dichloroethylene. Their report is found in J. Am. Chem. Soc., 71, 490 (1949).

SUMMARY AND DETAILS OF THE INVENTION

This invention relates to the preparation of cis- and trans-chlorocyclobutanecarbonitriles by the cycloaddition of vinyl chloride and an acrylonitrile of the formula

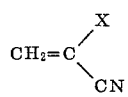

wherein X is hydrogen, chlorine, bromine or iodine. Preferably X is hydrogen or chlorine in which case the respective cycloadditions to vinyl chloride may be represented as

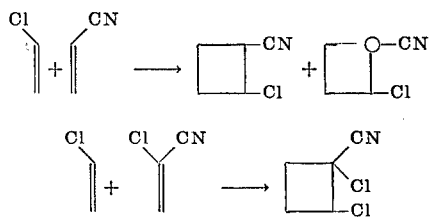

It is well known that acrylonitrile readily cyclodimerizes when heated to about 200° C. It is wholly unexpected, however, that vinyl chloride has a strong inhibitory effect on this cyclodimerization and that when the mole ratio of vinyl chloride to acrylonitrile is as low as 4.3:1 the cyclodimerization of acrylonitrile is completely suppressed, the heterocycloaddition proceeding in yields approaching the theoretical.

The cycloaddition reaction of this invention is effected by heating the reactants at temperatures in the range of 100–350° C. under pressures of not less than 400 atmospheres. Pressures can range up to 5000 atmospheres or higher. The temperatures and pressures at which the cycloadditions best proceed are interdependent and tend to exhibit an inverse relationship. Thus as pressures are increased the optimum reaction temperature decreases. Preferred operating conditions are as follows:

| Temperatures, ° C.: | Pressure, atms. |
|---|---|
| Below 140 | >4500 |
| 140–160 | >3000 |
| 160–225 | 400–3500 |

The most preferred temperature and pressure conditions for cycloaddition are 160–190° C. and 1000–3500 atmospheres.

The reactors employed in effecting the cycloadditions of this invention must be fabricated from a material of sufficient strength and inertness to withstand the high temperatures and pressures used. Modern high tensile steels are satisfactory for this purpose. While not essential it is generally preferable if the reactors are fabricated from or lined with stainless steel. Other satisfactory lining materials include Monel and the Hastelloys.

The examples of the cycloaddition of this invention, the details of which are set forth infra, illustrate batch operations in shaker tube reactors of 80–400 cc. capacity. These reactors can be used at pressures approaching 5000 atmospheres. In conducting the reactions reported in the examples the reactors were lined with stainless steel or "Hastelloy C." Cycloadditions can also be run in tubular reactions under turbulent flow conditions. This mode is operation is particularly desirable in view of the low conversions and high yield of the cycloaddition reaction.

Acrylonitrile and vinyl chloride of good commercial quality are adequately pure for use in the cycloaddition procedure of this invention. Highly refined "polymer grade" reactants, while not necessary, are nonetheless operable in practicing the invention. Because acrylonitrile is known to cyclodimerize it is desirable to employ a molar excess of vinyl chloride to suppress the cylodimerization that competes with cycloaddition. Mole ratios of vinyl chloride to acrylonitrile of about 100:1 to 5:1 can be used; the preferred ratio is 10:1 to 50:1.

Under most of the conditions employed in the practice of this invention vinyl chloride (critical temperature= 158.4° C.) is in the gaseous phase while acrylonitrile (critical temperature=246° C.) is in the liquid phase. Any means of agitation, e.g. shaking, stirring, turbulent flow in a tubular reactor or bubbling gaseous vinyl chloride through liquid acrylonitrile, serves to increase the rate of the desired cyclo-addition reaction. While such agitation is not essential to the success of the cycloaddition it is preferred and is therefore generally practiced.

The presence of a polymerization inhibitor is not critical to the success of the cycloaddition; in fact, some polymerization of the reactants may occur despite the presence of an inhibitor. If an inhibitor is used the preferable ones are hydroquinone, phenol, p-methoxyphenol and phenothiazine.

The cycloaddition of the present invention operates with equal efficiency in the presence or absence of oxygen or air. Acrylonitrile and 2-chloroacrylonitrile react readily with hydrogen chloride, however, and, since this compound is formed on prolonged heating of the reactant vinyl chloride, the unsaturated nitriles automatically remove the hydrogen chloride from the reaction medium. To preclude such dissipation of the unsaturated nitrile reactant the cycloaddition may be run in the presence of hydrogen chloride scavengers such as ethylene oxide.

EMBODIMENTS OF THE INVENTION

The following nonlimiting examples further illustrate the practice of the present invention. Unless otherwise indicated temperatures are in degrees centigrade and pressures are in atmospheres. The reaction mixtures were analyzed by gas-liquid partition chromatography using silicone gum nitrile or butanediol succinate as the liquid phase on "Chromsorb" solid supports. The chromatograph columns, four feet by ¼ inch, were operated at 150–200° C. using a helium flow of 40–60 cc./minute. Retention times were established by comparison with authentic specimens.

EXAMPLE 1

A "Hastelloy C"-lined, pressure resistant vessel of about 240 cc. volume was charged with 5 parts by weight of acrylonitrile, 1 part by weight of hydroquinone and 170 parts by weight of vinyl chloride. The vessel was closed, placed in a shaker machine, connected to a pressure gage and heated under agitation for sixteen hours at 190° C.; the pressure developed was 505 atmospheres. The reactor was then cooled to 0° C., vented to reduce whatever pressure remained, and opened. The contents were discharged and for convenience the reaction mixture was dissolved in about 100 parts by volume of acetonitrile. The resultant solution was either analyzed directly or distilled to separate the products. Analysis by gas-liquid partition chromatography showed conversions of the acrylonitrile to 0.12% of 3-chloropropionitrile, 0.14% of trans-2-chlorocyclobutanecarbonitrile and 0.11% of cis-2-chlorocyclobutanecarbonitrile.

EXAMPLE 2

Example 1 was repeated with the operating temperature set at 180° C. Analysis showed 0.006% conversion to 3-chloropropionitrile, and 0.101% to cis- and trans-2-chlorocyclobutanecarbonitrile. Of the acrylonitrile reacted, 94% was recovered as 2-chlorocyclobutanecarbonitriles.

EXAMPLE 3

Example 1 was repeated except for increasing the vinyl chloride to 210 parts by weight and operating at 210° C., 2740–3000 atmospheres pressure. The conversion to cis- and trans-2-chlorocyclobutanecarbonitriles was 1.18%.

EXAMPLE 4

A "Hastelloy C"-lined vessel was charged with about 7 parts of acrylonitrile, 1 part of hydroquinone, 0.1 part of phenol and 175 parts of vinyl chloride. The vessel was closed, place in a shaker machine and connected to a pressure gage and piston-driven injector charged with vinyl chloride. The reaction vessel and contents were then agitated and heated to 190° C. at which time additional vinyl chloride was injected to raise the pressure to 955 atmospheres. Heating at 190° C. and 775–955 atmospheres was continued for ten hours. Analysis showed the following conversions:

| | Percent |
|---|---|
| 3-chloropropionitrile | 0.22 |
| Trans-2-chlorocyclobutanecarbonitrile | 0.08 |
| Cis-2-chlorocyclobutanecarbonitrile | 0.13 |

EXAMPLE 5

The procedure of Example 4 was followed in the cycloaddition of 4 parts of acrylonitrile and 180 parts of vinyl chloride. The additives in this run were 1 part by weight each of hydroquinone, phenol and palladium chloride. The reaction was carried out at 170° C. and 700–970 atmospheres pressure, and vinyl chloride was injected periodically for ten hours to maintain the pressure. The conversion to 2-chlorocyclobutanecarbonitriles was 0.28%.

EXAMPLE 6

The procedure of Example 1 was followed using 20 parts of acrylonitrile, 215 parts of vinyl chloride and 1 part of hydroquinone. After reaction at 180° C. and 2950–3000 atmospheres for eight hours, 0.32% of the acrylonitrile was converted to 2-chlorocyclobutanecarbonitriles and 0.07% to 3-chloropropionitrile. The yield of 2-chlorocyclobutanecarbonitriles was 82%.

EXAMPLE 7

Example 6 was essentially repeated except for extending the reaction time to thirty-six hours. Considerable polymer was formed, but the conversion to 2-chlorocyclobutanecarbonitriles was 0.74%.

EXAMPLE 8

Example 6 was essentially repeated except for the omission of the hydroquinone. A 0.32% conversion at 94.5% yield of 2-chlorocyclobutanecarbonitriles was obtained.

EXAMPLE 9

The procedure of Example 4 was followed. The reactor charge consisted of 5 parts of acrylonitrile, 361 parts of vinyl chloride, and 0.1 part each of hydroquinone and phenol. Oxygen was throroughly excluded in the charging operation. The reaction vessel and its contents were then agitated and heated to 200° C., after which vinyl chloride was injected to raise the pressure to 900 atmospheres; heating and shaking were continued for 1.5 hours. The reaction mixture contained some polymeric product; the conversion to 2-chlorocyclobutanecarbonitriles amounted to 0.33%.

EXAMPLE 10

Example 1 was essentially repeated using a reactor charge of 5 parts of acrylonitrile, 95 parts of vinyl chloride and 0.1 part each of hydroquinone and phenol. In six hours at 140° C. and 4600 atmospheres pressure, 0.15% of the acrylonitrile was converted to 2-chlorocyclobutanecarbonitriles.

EXAMPLE II

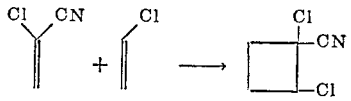

Using the apparatus and technique of Example 1, 0.1 part of hydroquinone, 0.1 part of phenol, and 5 parts of 2-chloroacrylonitrile were charge in a 240-ml. Hastelloy-lined reactor, pressured with vinyl chloride at 160° C. to 1000 atmospheres and heated at 160° C. for twenty-four hours. A 2.84% conversion to 1,2-dichlorocyclobutanecarbonitrile was obtained along with some 2,3-dichloropropionitrile, 1,2-dichloro-1,2-dicyanocyclobutanecarbonitrile and some unknown compounds.

The 1,2-dichlorocyclobutanecarbonitrile prepared from a similar experiment at 175° C. (8 hours at 1000 atmospheres) was identified by comparison of its time-of-flight mass spectrum with the mass spectrum of an authentic sample prepared as in Examples A and B.

EXAMPLE A

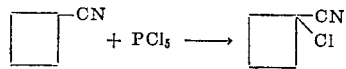

A mixture of 16.2 g. (0.2 mole) of cyclobutanecarbonitrile and 46 g. of PCl$_5$ (0.22 mole) was heated at reflux for four hours and distilled through a spinning-band column. The product, 21.0 g. (90%), was collected at 63° C. (25 mm.). The infrared spectrum showed a band at 2240 cm.$^{-1}$ (weak) for the nitrile absorption. The N.M.R. spectrum (CDCl$_3$) showed two complex multiplets at 7.2 (4 H's; 2- and 4-position hydrogens) and 7.75 (2 H's; 3-position hydrogens). The mass spectrum showed abundant peaks at $m/e$ 28 (C$_2$H$_4$, base peak) and $m/e$ 87, 89 (parent-C$_2$H$_4$).

Analysis.—Calcd. for C$_5$H$_6$NCl (115.57) (percent): C, 52.0; H, 5.2; N, 12.1; Cl, 30.70. Found (percent): C, 52.3; H, 5.4; N, 12.1; Cl, 30.50.

EXAMPLE B

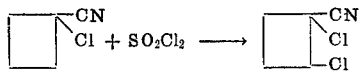

A 30-g. sample of 1-chlorocyclobutanecarbonitrile, 50 ml. of sulfuryl chloride and 200 mg. of benzoyl peroxide were heated at 83° C. (oil bath temperature) for seventeen hours. About 60% of the volume of the original mixture remained after this period. The mixture was fractionated (reflux ratio 20 to 30:1) through a 45 cm. spinning-band column at 37 mm. Fractions boiling at 115° C., 3.8 g. (9.7%), proved to be 1,2-dichlorocyclobutanecarbonitrile in excess of 90% purity. The product was further purified by preparative gas chromatography on a butanediol succinate column at 150° C. The mass spectrum showed peaks at $m/e$, 62, 64 (most abundant peak CH$_2$CHCl$^+$), 87, 89 (CH$_2$=CClCN$^+$), 121, 123, 125 (CHCl=CClCN$^+$) and 28 (CH$_2$=CH$_2^+$). The mass spectrum was substantially identical with that of the product of Example 11. The infrared spectrum showed a CN band at 2242 cm.$^{-1}$; the proton N.M.R. spectrum showed CHCl at 5.4 and the two methylene groups in a complex at 6.65–7.9.

Analysis.—Calcd. for C$_5$H$_5$Cl$_2$N (150.01) (percent): C, 40.0; H, 3.4; N, 9.3; Cl, 47.3. Found (percent): C, 39.5; H, 3.4; N, 9.4; Cl, 47.7.

The cycloaddition products of this invention are important in providing the starting material for a novel, potentially low-cost, one-step route to 1-cyanocyclobutene, a compound useful in imparting improved properties to copolymers with acrylonitrile. In general, copolymers containing cyanocyclobutene are tough and non-brittle and hence useful in the fabrications of molded objects, in films for wrapping and packaging and in sheet form, alone or as coatings on other polymeric or glass substrates for use as translucent or transparent glazing material. Protective coatings for a wide variety of substrates may be applied from melts or solutions of these copolymers. The copolymers are especially useful in fiber form for usual fiber applications.

Conversion of the cyclobutanecarbonitriles of this invention to the useful copolymer ingredient cyanocyclobutene is illustrated in Examples C and D.

EXAMPLE C

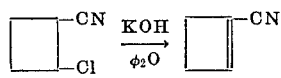

A three-necked round-bottom flask with thermometer well was fitted with a pressure-equalizing addition funnel, motor-driven stirrer, thermometer and a gas exit connected via rubber tubing (sufficient in length to be clamped by a hemostat) to a series of traps containing a trace of hydroquinone. The traps were cooled by Dry Ice and liquid nitrogen. The gas exit and traps were washed with concentrated HCl and acetone and were thoroughly dried before use; the rubber connecting tubing was washed with 3 N HCl and acetone and dried. The system was dried under vacuum and charged with 6.0 g. (0.11 mole) of 85% KOH pellets and 50 ml. of diphenyl ether (nitrogen atmosphere).

The addition funnel was charged with 5.8 g. (0.05 mole) of the 2-chlorocyclobutanecarbonitriles (99% cis, 1% trans), and the system evacuated to 20 mm. The flask was heated with stirring to 115° C. to "liquefy" the KOH and the 2-chlorocyclobutanecarbonitrile was added dropwise at 110–115° C. over 30 minutes. Judicious application of heat from a mantel, cooling with a water bath and occasional application of the hemostat clamp were necessary to control the reaction and prevent flooding into the product collection traps. When the addition was complete, the pressure was slowly reduced to 0.3 mm. (occasional closure of the hemostat was required) to strip off the product. The pot temperature dropped but was maintained at 50° C. with a hot water bath for one hour. The contents of the Dry Ice trap were distilled (after removing water) at 0.3 mm. into an acid-washed trap containing hydroquinone. The cyanocyclobutene (2.3 g.; 58%) thus obtained was shown to be pure by gas chromatography and to have an infrared spectrum identical with that of an authentic sample. The procedure was repeated with a 1:1 mixture of cis- and trans-2-chlorocyclobutanecarbonitriles at 15 mm. and a 76% yield of redistilled cyanocyclobutene (B.P. 42° C. at 18 mm.) was obtained.

EXAMPLE D

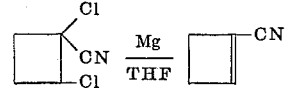

A mixture of 1.5 g. (0.01 mole) of 1,2-dichlorocyclobutanecarbonitrile (80% pure, containing other dichlorocyclobutanecarbonitriles), 0.5 g. (0.02 mole) of crushed magnesium turnings and 30 ml. of dry tetrahydrofuran (THF) was stirred at room temperature. Activated magnesium (about 100 mg., prepared from ethylene dibromide, Mg and THF) and ethylene dibromide (about 2 g.) were used to promote the reaction. The reaction became exothermic, and the mixture turned dark brown and bubbled. When the temperature rose to 40° C. the reaction was quenched with a water bath to room temperature. After stirring for about 50 minutes, gas chromatographic analysis indicated the presence of 161 mg. of 1-cyanocyclobutene and 1.190 g. of starting material along with some ethylene dibromide (analyses high due to evaporation of THF). A precipitate appeared on the sides of the flask as stirring continued; 25 ml. of THF was added to dissolve the solid, and the reaction mixture was stirred overnight. Gas chromatographic analysis showed essentially no change. The tetrahydrofuran was distilled at 40 mml., and the remaining volatile materials were distilled at 1 mm. onto Dry Ice cooled traps by heating the flask with a heat gun.

It was estimated that the combined distilled material amounted to 39.9 mg. of 1-cyanocyclobutene and 188 mg. of 1,2-dichlorocyclobutanecarbonitrile. The products in the mixture were identified by spectral comparisons with independently synthesized authentic materials.

The embodiments of the invention in which an exclusive property or privilege is claimed are defined as follows:

1. A process for the preparation of mono- and dichlorocyclobutanecarbonitriles which comprises reacting vinyl chloride and an acrylonitrile of the formula

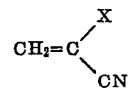

wherein X is hydrogen, chlorine, bromine or iodine, and wherein the mole ratio of vinyl chloride to acrylonitrile is between about 5:1 to 100:1, at a temperature in the range 100–350° C. and at a pressure in the range 400–5000 atmospheres.

2. The process of claim 1 wherein the temperature is in the range 100–140° C. and the pressure is in the range 4500–5000 atmospheres.

3. The process of claim 1 wherein the temperature is in the range 140–160° C. and the pressure is in the range 3000–5000 atmospheres.

4. The process of claim 1 wherein the temperature is in the range 160–225° C. and the pressure is in the range 400–3500 atmospheres.

5. The process of claim 1 wherein the temperature is in the range 160–190° C. and the pressure is in the range 1000–3500 atmospheres.

6. The process of claim 1 wherein the mole ratio of vinyl chloride to acrylonitrile is between 10:1 and 50:1.

References Cited
UNITED STATES PATENTS

| | | | |
|---|---|---|---|
| 3,066,148 | 11/1962 | Winstein | 260—464 X |
| 3,099,680 | 7/1963 | Sennewald et al. | 260—464 |
| 3,202,697 | 8/1965 | Idol, Jr. et al. | 260—464 |
| 3,203,973 | 8/1965 | Griffin | 260—464 |
| 3,265,723 | 8/1966 | Lehn et al. | 260—464 |
| 3,317,586 | 5/1967 | Burpitt et al. | 260—464 X |

JOSEPH P. BRUST, Primary Examiner

U.S. Cl. X.R.

260—465.7